United States Patent Office 3,312,700

Patented Apr. 4, 1967

1

3,312,700

PYRAZINEACETONITRILES AND METHODS OF PREPARING

Antony M. Akkerman, Geertruida Cornelia Van Leeuwen, and Josephus F. Michels, Amsterdam, Netherlands, assignors to N.V. Nederlandsche Combinatie Voor Chemische Industrie, Amsterdam, Netherlands, a limited-liability company of the Netherlands No Drawing. Filed May 6, 1964, Ser. No. 365,502
Claims priority, application Netherlands, May 10, 1963, 292,632
6 Claims. (Cl. 260—250)

This invention relates to novel pyrazineacetonitriles and to methods of preparing them.

In British Patent No. 893,391, which corresponds to U.S. Patent No. 3,006,918, there are described pyrazineacetonitriles substituted on the alpha position by at least one aryl group.

It has now been found that pyrazineacetonitriles, having either no substituents on the alpha position or only alkyl- and/or cycloalkyl- and/or tertiary aminoalkyl substituents, each of the alkyl and cycloalkyl groups containing up to seven carbon atoms, and each of the tertiary aminoalkyl groups has its alkyl radical containing at most five carbon atoms, are also useful compounds. They have been found to possess pharmacological, especially sedative, properties. Moreover, the novel compounds are valuable intermediates in preparing other pharmacologically active compounds, for example, as disclosed in our co-pending application of even date herewith, and which corresponds to Dutch patent application No. 292,633.

The compounds according to this invention are represented by the following general formula:

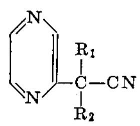

in which $R_1$ and $R_2$ are each selected from the group consisting of hydrogen, alkyl and cycloalkyl containing up to seven carbon atoms, and tertiary aminoalkyl in which the alkyl radical contains at most five carbon atoms.

The novel compounds according to the invention can be prepared by methods which are, in part, the same as known methods previously used for producing analogous compounds. The most convenient method consists in introducing the cyano group on the active alpha position of alkylpyrazines by reacting said pyrazines, under the influence of a suitable alkaline condensing agent in a dry reaction medium, with a properly substituted cyanamide. Such a method has been described for the preparation of among others, acridyl-(9)-acetonitrile, by H. Lettré et al., Ber. 85, 397 (1952). Said method is especially valuable in preparing the unsubstituted pyrazineacetonitrile.

Just as in the known method, identified above, N-methyl-N-phenylcyanamide has been found to be a proper cyanamide for introducing the cyano group, while sodium amide may be used advantageously as a suitable alkaline condensing agent.

However, contrary to the method of Lettré et al., it has been found that, in preparing the compounds according to the invention, liquid ammonia is the preferred reaction medium.

It has further been found that the monocyanation reaction gives best results with a molar proportion of one part of N-methyl-N-phenylcyanamide to two parts of methylpyrazine and two parts of sodium amide.

2

Further, it has been found to be particularly advantageous to obtain the compound substituted on the alpha position by alkyl- and/or cycloalkyl- and/or tertiary aminoalkyl groups, by reacting pyrazineacetonitrile, under the influence of a suitable alkaline condensing agent in a dry reaction medium, with an alkyl- cycloalkyl- or tertiary aminoalkyl halide. Dependent on the molar ratio of the reactants, it is possible to introduce one or two substituents on the alpha carbon atom. After the introduction of one substituent, the product obtained can be subjected again to this type of reaction in order to obtain a pyrazineacetonitrile derivative having two different substituents on the alpha carbon atom. This second method has been described for analogous compounds in the British Patent No. 893,391, mentioned above. Also in this reaction, liquid ammonia has been found to be a very suitable reaction medium.

The novel compounds according to the invention can be embodied in any of the forms suitable for therapeutic administration, such as tablets, pills, solutions, etc.

The following examples serve to illustrate the methods by which the novel compounds according to the invention can be obtained, and are not intended to restrict the invention to the compounds or methods specifically described.

*Example 1*

To a suspension of 143 grams (3.67 moles) of sodium amide in 1.5 litres of liquid ammonia are added (dropwise, in thirty minutes) 346 grams (3.68 moles) of methylpyrazine, followed by a mixture of 230 grams (1.74 moles) of N-methyl-N-phenyl-cyanamide and 100 cc. of dioxane. The reaction mixture is stirred for four hours at the boiling temperature of liquid ammonia.

Thereupon, 200 grams of ammonium chloride are added and the mixture is allowed to stand until the ammonia has evaporated. The remaining mixture is stirred with chloroform and a little methanol, after which the inorganic salts are filtered off.

The solvents are removed by distillation under normal pressure and the residue is fractionated at a pressure of 14 mm. of mercury and with the aid of a Vigreux column. Up to 65° C., 150 grams of methylpyrazine are recovered, whereas from 81–108° C. a fraction of 207 grams is collected, consisting mainly of N-methylaniline. The desired product, pyrazineacetonitrile, distills at 134–137.5° C.

Yield 166.2 grams. The colorless product is crystallized from ether, after which it melts at 34–36° C.

*Example 2*

To a suspension of 7.8 grams (0.2 mole) of sodium amide in 150 cc. of liquid ammonia is added a solution of 23.8 grams (0.2 mole) of pyrazineacetonitrile in 20 cc. of dioxane. The deep red reaction mixture is stirred continuously, and, after thirty minutes, 24.6 grams (0.2 mole) of propyl bromide are added dropwise and, four hours afterwards, 150 cc. of dioxane are added all at once. Hereupon, stirring is continued for 16 hours at room temperature and for one hour under reflux. The solvent is removed by distillation, the residue is taken up into ether, the solution is washed three times with a little water and dried over magnesium sulphate. After evaporating the solvent, the residue is distilled in vacuo, yielding 20.4 grams of alpha-n.propyl-pyrazineacetonitrile (B.P.$_{12}$ 136–138° C.; $n_D^{20}$ 1.5060).

*Example 3*

In the same way as described in Example 2, but using ethyl bromide instead of propyl bromide, alpha-ethyl-pyrazineacetonitrile is obtained. (B.P.$_3$ 95° C.; $N_D^{20}$ 1.5140).

*Example 4*

In the same way as described in Example 2, but using isopropyl bromide instead of propyl bromide, alpha-isopropyl-pyrazineacetonitrile is obtained ($B.P._{0.3}$ 69° C.; $n_D^{19}$ 1.5125).

*Example 5*

In the same way as described in Example 2, but using butyl bromide instead of propyl bromide, alpha-butyl-pyrazineacetonitrile is obtained ($B.P._{0.5}$ 95–98° C.; $n_D^{23}$ 1.5008).

*Example 6*

In the same way as described in Example 2, but using 0.4 mole of methyl iodide instead of 0.2 mole of propyl bromide, alpha, alpha-dimethyl-pyrazineacetonitrile is obtained ($B.P._{14}$ 112–113° C.; $n_D^{20}$ 1.5041).

*Example 7*

In the same way as described in Example 2, but using 2-diethylaminoethyl chloride instead of propyl bromide, alpha-(2-diethylaminoethyl)-pyrazineacetonitrile is obtained ($B.P._{0.3}$ 110–112° C.; $n_D^{20}$ 1.5050).

*Example 8*

In the same way as described in Example 2, however, starting from alpha-butyl-pyrazineacetonitrile obtained according to Example 5, and using methyl iodide as the alkylating agent, alpha-methyl-alpha-butyl-pyrazineacetonitrile is obtained ($B.P._{1.8}$ 90–91° C.; $n_D^{23}$ 1.4948).

The reaction described above can also be used in preparing the alpha-aryl substituted pyrazineacetonitriles described in the before-mentioned British Patent No. 893,391, in which case the sequence of substitution is reversed. The preparation of one representative of this type of compounds is given below.

*Example 9*

In the same way as described in Example 2, but now using 0.2 mole of bromobenzene instead of 0.2 mole of propyl bromide, a solution of alpha-phenyl-pyrazineacetonitrile in ether is obtained. After evaporating the solvent, a solid is left which can be crystallized from methanol. M.P. 129–130° C.

What is claimed is:

1. A compound represented by the formula:

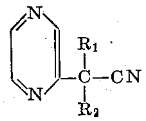

in which $R_1$ and $R_2$ are each selected from the group consisting of hydrogen, loweralkyl and di(loweralkyl) aminoloweralkyl.

2. Pyrazineacetonitrile.

3. Alhpa-methyl-alpha-n.butyl-pyrazineacetonitrile.

4. A method of preparing a compound represented by the formula

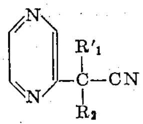

in which $R'_1$ is selected from the group consisting of loweralkyl and di(loweralkyl)aminoloweralkyl; and $R_2$ is selected from the group consisting of hydrogen, loweralkyl and di(loweralkyl)aminoloweralkyl: comprising reacting pyrazineacetonitrile in liquid ammonia and in the presence of sodium amide with a halide of the formula $R'_1$ Hal, in which Hal represents a halogen atom; followed, in the case where $R_2$ has any of the above meanings except hydrogen, by reacting the product obtained, in liquid ammonia and in the presence of sodium amide.

5. A method of preparing a compound represented by the formula

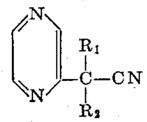

in which $R_1$ and $R_2$ are each selected from the group consisting of hydrogen, lower alkyl and di(loweralkyl) aminoloweralkyl: comprising reacting an alkylpyrazine of the formula

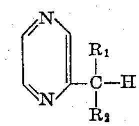

with N-methyl-N-phenylcyanamide in liquid ammonia and in the presence of sodium amide as a condensing agent.

6. A method for preparing alpha-phenyl-pyrazineacetonitrile, comprising reacting pyrazineacetonitrile in liquid ammonia and in the presence of sodium amide as a condensing agent with halobenzene.

References Cited by the Examiner

UNITED STATES PATENTS 3,006,918 10/1961 DeJongh ----------- 260—250

OTHER REFERENCES

Karmas et al.: Jour. Amer. Chem. Soc., vol. 78, pp. 2141–2144, (1956).

NICHOLAS S. RIZZO, *Primary Examiner.*